United States Patent
Roth et al.

(10) Patent No.: US 12,010,121 B2
(45) Date of Patent: *Jun. 11, 2024

(54) GRADUAL CREDENTIAL DISABLEMENT

(71) Applicant: Google LLC, Mountain View, CA (US)

(72) Inventors: Gregory Roth, Mountain View, CA (US); Naveen Chand, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,035

(22) Filed: Apr. 27, 2022

(65) Prior Publication Data
US 2022/0255947 A1 Aug. 11, 2022

Related U.S. Application Data

(63) Continuation of application No. 15/908,842, filed on Mar. 1, 2018, now Pat. No. 11,343,260.

(51) Int. Cl.
*H04L 9/40* (2022.01)
*G06F 21/31* (2013.01)
*G06F 21/45* (2013.01)

(52) U.S. Cl.
CPC ............ *H04L 63/108* (2013.01); *G06F 21/31* (2013.01); *G06F 21/45* (2013.01); *H04L 63/068* (2013.01); *H04L 63/20* (2013.01); *G06F 2221/2137* (2013.01)

(58) Field of Classification Search
CPC ..... H04L 63/108; H04L 63/068; H04L 63/20; G06F 21/31; G06F 21/45

USPC ............................................................ 726/4
See application file for complete search history.

(56) References Cited

U.S. PATENT DOCUMENTS

| | | | |
|---|---|---|---|
| 6,145,086 A | 11/2000 | Bellemore et al. | |
| 7,886,335 B1 | 2/2011 | Chickering et al. | |
| 7,945,776 B1 * | 5/2011 | Atzmony | H04L 9/0866 713/184 |
| 8,281,379 B2 | 10/2012 | Noe | |
| 8,584,219 B1 * | 11/2013 | Toole | H04L 69/24 726/25 |
| 9,124,636 B1 | 9/2015 | Rathor | |

(Continued)

OTHER PUBLICATIONS

EPO, European Search Report relating to application No. 22190810.6, dated Nov. 4, 2022.

(Continued)

*Primary Examiner* — Dereena T Cattungal
(74) *Attorney, Agent, or Firm* — Honigman LLP; Brett A. Krueger

(57) ABSTRACT

A method for a gradual credential disablement is provided. The method includes receiving, at data processing hardware, a request for access to a resource. The request includes a request authenticator. The method also includes comparing, by the data processing hardware, the request authenticator against a security credential associated with the resource. The method further includes determining, by the data processing hardware, whether the request authenticator satisfies the security credential. When the request authenticator satisfies the security credential, the method includes granting or denying, by the data processing hardware, access to the resource based on a request failure rate associated with the security credential.

18 Claims, 14 Drawing Sheets

(56) References Cited

U.S. PATENT DOCUMENTS

| | | | |
|---|---|---|---|
| 9,438,604 B1* | 9/2016 | Addala | H04L 63/0853 |
| 9,544,292 B2 | 1/2017 | Irving, Jr. et al. | |
| 9,635,035 B2 | 4/2017 | Addala et al. | |
| 9,736,169 B2* | 8/2017 | Addala | H04L 63/0853 |
| 10,419,445 B2* | 9/2019 | Eberlein | H04L 63/108 |
| 2008/0120699 A1 | 5/2008 | Spear | |
| 2009/0037979 A1* | 2/2009 | Dellaratta, Jr. | H04W 12/069 |
| | | | 726/2 |
| 2009/0199264 A1* | 8/2009 | Lang | G06F 21/31 |
| | | | 726/1 |
| 2009/0217058 A1 | 8/2009 | Obereiner et al. | |
| 2010/0148922 A1 | 6/2010 | Yamada et al. | |
| 2013/0047210 A1 | 2/2013 | Rotman | |
| 2013/0340052 A1* | 12/2013 | Jakobsson | G06Q 20/4016 |
| | | | 726/5 |
| 2014/0096210 A1* | 4/2014 | Dabbiere | H04L 63/0861 |
| | | | 726/5 |
| 2014/0208386 A1* | 7/2014 | Sama | H04L 63/14 |
| | | | 726/4 |
| 2014/0282868 A1* | 9/2014 | Sheller | G06F 21/316 |
| | | | 726/3 |
| 2014/0373104 A1* | 12/2014 | Gaddam | H04L 63/105 |
| | | | 726/4 |
| 2016/0008796 A1 | 3/2016 | Irving, Jr. et al. | |
| 2016/0087964 A1 | 3/2016 | Irving, Jr. et al. | |
| 2016/0125199 A1* | 5/2016 | Lee | G06F 21/316 |
| | | | 726/28 |
| 2016/0218942 A1 | 7/2016 | Choquette et al. | |
| 2016/0308848 A1 | 10/2016 | Jakobsson et al. | |
| 2016/0035795 A1 | 12/2016 | Kruse | |
| 2016/0357955 A1 | 12/2016 | Kruse | |
| 2017/0155800 A1 | 6/2017 | Nagasawa | |
| 2017/0230179 A1 | 8/2017 | Mannan et al. | |
| 2019/0273748 A1* | 9/2019 | Roth | H04L 63/068 |

OTHER PUBLICATIONS

International Search Report and Written Opinion for the related PCT Application No. PCT/US2019/014019 dated Mar. 13, 2018.

USPTO, Office Action relating to U.S. Appl. No. 15/908,842, dated Sep. 2, 2021.

* cited by examiner

GRADUAL CREDENTIAL DISABLEMENT

CROSS REFERENCE TO RELATED APPLICATIONS

This U.S. patent application is a continuation of, and claims priority under 35 U.S.C. § 120 from, U.S. patent application Ser. No. 15/908,842, filed on Mar. 1, 2018. The disclosure of this prior application is considered part of the disclosure of this application and is hereby incorporated by reference in its entirety.

TECHNICAL FIELD

This disclosure relates to gradual credential disablement.

BACKGROUND

With the vast amount of computing resources today, users, owners and administrators related to these resources often limit or restrict resource access. For these restrictions, it is commonplace to use different types of credentials to verify and authenticate identities of entities who are attempting to access the resources. Thus, security credentials have become an integral pan of resource access. This is especially true for larger computing environments (cloud service environments and distributed systems) that have shared resources and/or numerous users. It is common security practice to rotate security credentials to prevent unauthorized access to resources. Yet a setback to these practices is that change to security credentials risks outages or other compatibility issues with running services. These risks are often coupled with the standard practice that security credentials being replaced are generally disabled all at once.

SUMMARY

One aspect of the disclosure provides a method for gradual credential disablement. The method includes receiving, at data processing hardware, a request for access to a resource, the request includes a request authenticator. The method also includes comparing, by the data processing hardware, the request authenticator against a security credential associated with the resource and determining, by the data processing hardware, whether the request authenticator satisfies the security credential. When the request authenticator satisfies the security credential, the method further includes granting or denying, by the data processing hardware, access to the resource based on a request failure rate associated with the security credential.

Implementations of the disclosure may include one or more of the following optional features. In some implementations, when the request authenticator satisfies the security credential, the method includes determining, by the data processing hardware, that the request failure rate is disabled and granting, by the data processing hardware, access to the resource. Granting or denying access to the resource may include obtaining, a random number, comparing the random number with a reference number associated with the request failure rate, and granting or denying access to the resource when the random number satisfies the comparison with the reference number.

In some examples, the method includes determining, by the data processing hardware, that a number of received requests having corresponding request authenticators satisfying the security credential satisfies a threshold number and implementing a remedial action. Here, the remedial action may include granting access to the resource when the request authenticator satisfies the security credential and not enforcing the request failure rate associated with the security credential.

In some configurations, determining whether the request authenticator satisfies the security credential includes: comparing, by the data processing hardware, the request authenticator against a new security credential associated with the resource; determining, by the data processing hardware, that the request authenticator satisfies the new security credential; and granting, by the data processing hardware, access to the resource. Here, the method may further include determining, by the data processing hardware, that the requester security credential fails to satisfy the security credential or the new security credential and denying, by the data processing hardware, access to the resource.

In some implementations, the security credential comprises at least one of a public key or a hash message authentication code (hmac) key. The request failure rate may increase based on a function of time. The request failure rate may include at least one of a denial count for request authenticators satisfying the security credential, a percentage of request authenticators satisfying the security credential and denied access to the resource, or a percentage of request authenticators satisfying the security credential and granted access to the resource. The method may also include receiving, at the data processing hardware an indication of a selection of the resource through a user interface for a security credential update, an association of the new security credential with the resource, and the request failure rate for requests to access the resource using the security credential. In some examples, the method also includes receiving, at the data processing hardware, a failure rate change request configured to change the request failure rate.

Another aspect of the disclosure provides a method for a technical field. The method includes receiving, at data processing hardware, a request for access to a resource, the request including a request authenticator. The method also includes comparing, by the data processing hardware, the request authenticator against an old security credential associated with the resource and a new security credential associated with the resource. The method further includes determining, by the data processing hardware, whether the request authenticator satisfies the old security credential. When the request authenticator satisfies the old security credential, the method includes granting or denying, by the data processing hardware, access to the resource based on a request failure rate associated with the old security credential.

This aspect may include one or more of the following optional features. In some examples, when the request authenticator satisfies the old security credential, the method includes determining, by the data processing hardware, that the request failure rate is disabled and granting, by the data processing hardware, access to the resource. Granting or denying access to the resource may include obtaining a random number, comparing the random number with a reference number associated with the request failure rate, and granting or denying access to the resource when the random number satisfies the comparison with the reference number.

In some configurations, the method includes determining, by the data processing hardware, that a number of received requests having corresponding request authenticators satisfying the old security credential satisfies a threshold number and implementing a remedial action. The remedial action may include granting access to the resource when the request authenticator satisfies the old security credential and not enforcing the request failure rate associated with the old security credential.

Determining whether the request authenticator satisfies the old security credential may include determining, by the data processing hardware, that the request authenticator satisfies the new security credential and granting, by the data processing hardware, access to the resource. The method may also include determining, by the data processing hardware, that the request authenticator fails to satisfy the old security credential or the new security credential and denying, by the data processing hardware, access to the resource. The old security credential or the new security credential may include at least one of a public key or a hash message authentication code (hmac) key.

In some examples, the request failure rate increases based on a function of time. The request failure rate may include at least one of: a denial count for request authenticators satisfying the old security credential, a percentage of request authenticators satisfying the old security credential and denied access to the resource, or a percentage of request authenticators satisfying the old security credential and granted access to the resource. Optionally the method may include receiving, at the data processing hardware, an indication of a selection of the resource through a user interface for a security credential update, an association of the new security credential with the resource, and the request failure rate for requests to access the resource using the old security credential.

Yet another aspect of the disclosure provides a method for a gradual credential disablement. The method includes receiving, at data processing hardware, a request for access to a resource. The request includes a request authenticator. The method also includes comparing, by the data processing hardware, the request authenticator against an old security credential associated with the resource and a new security credential associated with the resource. When the request authenticator satisfies the old security credential, the method further includes granting or denying access to the resource based on a request failure rate associated with the old security credential. When the request authenticator satisfies the new security credential, the method includes granting access to the resource. When the request authenticator fails to satisfy the old security credential and the new security credential, the method includes denying access to the resource.

This aspect may include one or more of the following optional features. In some implementations, granting or denying access to the resource includes obtaining a random number, comparing the random number with a reference number associated with the request failure rate, and granting or denying access to the resource when the random number satisfies the comparison with the reference number.

In some examples, the method includes determining, by the data processing hardware, that a number of received requests having corresponding request authenticators satisfying the old security credential satisfies a threshold number and implementing a remedial action. Here, the remedial action may include granting access to the resource when the request authenticator satisfies the old security credential and not enforcing the request failure rate associated with the old security credential. Optionally, the failure rate may include at least one of a denial count for request authenticators satisfying the old security credential; a percentage of request authenticators satisfying the old security credential and denied access to the resource, or a percentage of request authenticators satisfying the old security credential and granted access to the resource.

In some configurations, the method includes determining at the data processing hardware, a customer associated with the request for access to the resource from a plurality of customers, at least one customer of the plurality of customers associated with a security policy, the security policy including the request failure rate associated with the old security credential. In this configuration, the method also includes determining, at the data processing hardware, that the customer associated with the request corresponds to the security policy and granting or denying, by the data processing hardware, access to the resource based on the request failure rate associated with security policy when the request authenticator satisfies the old security credential.

Another aspect of the disclosure provides a method for a gradual credential disablement. The method includes receiving, at a distributed system, an indication of a selection of a resource through a programmable interface for a security credential update, the resource having an associated old security credential. The method also includes receiving, at the distributed system, an association of a new security credential with the resource. The method further includes receiving, at the distributed system, a request failure rate for requests to access the resource using the old security credential. The distributed system is configured to enforce the request failure rate for granting or denying access to the resource in response to receiving a given request having a corresponding request authenticator satisfying the old security credential.

Optionally, the method includes receiving, at the distributed system, health metric information corresponding to at least one system health metric and a remediation action. The remedial action is configured to remediate the at least one system health metric. The method may further include determining, by the distributed system, that the at least one system health metric indicates remediation. The method also may include implementing, by the distributed system, the remediation action.

This aspect may include one or more of the following optional features. In some examples, the method includes receiving, at the distributed system, a failure rate graduation, the failure rate graduation causing the failure rate to increase based on a function of time.

In some implementations, the distributed system is configured to perform operations including receiving the given request for access to the resource, the given request including the request authenticator and comparing the request authenticator against the old security credential associated with the resource and the new security credential associated with the resource. When the request authenticator satisfies the old security credential, the operations may include granting or denying access to the resource based on the request failure rate associated with the old security credential. When the request authenticator satisfies the new security credential, the operations may include granting access to the resource. When the requester security credential fails to satisfy the old security credential and the new security credential, the operations my include denying access to the resource.

The details of one or more implementations of the disclosure are set forth in the accompanying drawings and the description below. Other aspects, features, and advantages will be apparent front the description and drawings, and from the claims.

DESCRIPTION OF DRAWINGS

Like reference symbols in the various drawings indicate like elements.

DETAILED DESCRIPTION

With security credentials becoming increasingly more common, it has also become common security practice to rotate security credentials used as keys within computing environments such as cloud service environments. Typically, rotations of security credentials cause outages or other compatibility issues with running services. Some of these issues arise because of a lack of gradual credential disablement. Generally, gradual credential disablement is any method of causing a rate of credential acceptance to vary over time. Rather than gradual credential disablement, security credentials being replaced are generally disabled all at once causing issues for clients who, for example, have yet to receive a replacement security credential. Such issues may cause valuable disruptions to cloud service environments depending on the size or the scale of the client(s).

To address these shortcomings, gradual credential disablement permits a flexible and customizable denial rate (e.g., a failure rate) for the old security credentials that may be adjusted over time. In some examples, a client customizes the denial rate (e.g., at preconfigured time set points) to fit his or her needs corresponding to the resource related to the security credential. An advantage here is that a client may identify more critical resources and gradually update the related security credentials of those resources to avoid large—and potentially costly—issues. Another advantage is that the client may exponentially increase, decrease, halt, or rollback the update based on a real-time performance of the update via the denial rate. Furthermore, with a gradual denial approach, clients may also be monitored or monitor system health metrics, such as success rates of the replacement security credential during a period where either the old security credential or the replacement security credential may provide access to the system. Therefore, both the client and the provider of the replacement security credential may have time to troubleshoot the security credential replacement process.

Figure 1:
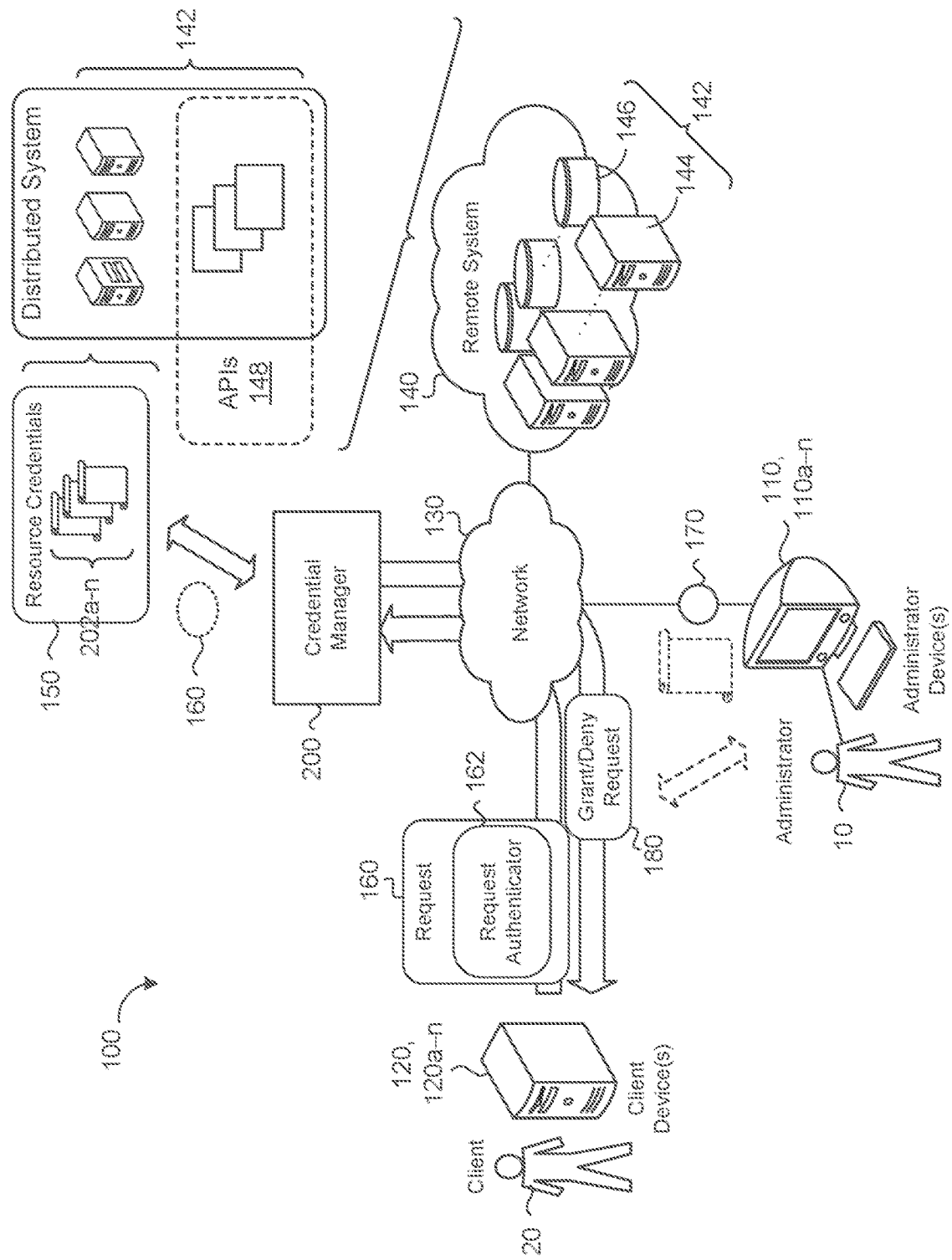
FIG. 1 is a schematic view of an example credential system for managing access to resources.

Referring to FIG. 1, in some implementations, a credential system 100 includes one or more administrative devices 110a-n associated with an administrator 10, who may communicate, via a network 130 with a remote system 140. The credential environment may further include one or more client devices 120a-n associated with one or more clients 20, who communicate via the network 130 with the remote system 140. The remote system 140 may be a distributed system (e.g., a cloud environment) having scalable/elastic resources 142. The resources 142 include computing resources 144 (e.g., data processing hardware) and/or storage resources 146 (e.g., memory hardware). In some examples, the client 20 and/or administrator 10 interfaces with the resources 142 via an application programming interface (API) 148. API(s) 148 generally provide some layer of abstraction with the resources 142 to simplify interaction and use of the resources 142. In some implementations, the remote system 140 includes one or more resource credential systems 150 to access all or part of the remote system 140. For example, the remote system 140 uses a resource credentials system 150 to call API(s) 148. The resource credential system 150 may have one or more credential managers 200, 200a-n for managing activities, such as access, upkeep, updates, replacement, creation, deletion, etc., related to the resources 142.

The administrator devices 110 and the client devices 120 can be any computing devices or data processing hardware capable of communicating with the credential manager 200 through the network 130. The administrator and client devices 110, 120, respectively, include, but are not limited to, desktop computing devices and mobile computing devices, such as laptops, tablets, smart phones, and wearable computing devices (e.g., headsets and/or watches). The administrator devices 110 may correspond to an administrator 10 or operator of the remote system 140 and the client devices 120 may correspond to clients 20 of the remote system 140 that deploy and/or access software applications and/or API(s) 148 executing on the remote system 140.

In some implementations, the resource credential system 150 includes security credentials 202a-n corresponding to resources 142 of the remote system 140. Accordingly, the security credentials 202a-n may correspond to a single resource 142 or to any combination of resources 142 of the remote system 140, such as API(s) 148, software applications, computing resources 144, and/or storage resources 146. A security credential 202 may generally refer to a type of digital verification to indicate an identity (e.g., the identity of a client 20 or an administrator 10) and whether that identity has permission to access the resource(s) 142 associated with the security credential 202. There are different types of security credentials 202 with varying degrees of complexities. In more complex security credentials 202, the security credential 202 may include further evidence as to an identity's authority, status, rights, privileges, etc. with respect to the resource(s) 142 associated with the security credential 202. For example, one type of security credential 202 is a user name and a password. Another example of a security credential 202 is an access key, such as a public key or a message authentication code (e.g., a keyed-hash message authentication code (hmac)).

In some examples, the client 20 sends a request 160 via the network 130 to access the remote system 140. Here, the request 160 includes a request authenticator 162. Some examples of request authenticators 162 are client identifiers, unique identifiers (UIDs), client secrets, tokens, usernames, and passwords, or any other identifier that may authenticate an identity. In some implementations, the credential manager 200 receives the request 160 for access to a resource 142 from a client 20 and/or a client device 120. With the request authenticator 162 from the request 160, the credential manager 200 compares the request authenticator 162 against a security credential 202 associated with the resource 142 corresponding to the request 160. In some examples, there is a single security credential 202 associated with the resource 142 of the request 160. In other examples, the credential manager 200 compares the request authenticator 152 against more than one security credential 202 associated with the resource 132 of the request 160. The resource credential system 150 may be part of the credential manager 200 (e.g., a database of security credentials 202a-n within the credential manager 200 as shown in FIG. 3B) or separate from the credential manager 200 such that the credential manager 200 communicates with the resource credential system 150 to compare the request authenticator 162 against the security credential 202. For example, the credential manager 200 may be configured to retrieve and/or request security credentials 202a-n associated with the resource 142 of the request 160 from a resource credential system 150 separate from the credential manager 200. Based on the comparison between the request authenticator 162 and at least one security credential 202 associated with the resource 142 of the request 160, the credential manager 200 is configured to determine whether the request authenticator 162 satisfies the security credential 202. The credential system 100 may consider the security credential 202 satisfied when the security credential 202 includes an indicia that the request authenticator 162 corresponds to an authentic identity. For example, the security credential 202 includes a compilation of authenticators (e.g., signatures, fingerprints, certificates, and/or tokens) corresponding to authentic identities that may match the request authenticator 162. When the request authenticator 162 satisfies the security credential 202, the credential manager 200 is configured to grant or to deny access to the resource 142 based on a request failure rate 170 associated with the security credential 202.

In some examples, the request failure rate 170 is a preprogrammed or preset rate corresponding to a denial rate for when the requester authenticator 162 satisfies the security credential 202. The request failure late 170 may control the disablement of the security credential 202. In some examples, either the administrator 10 (FIGS. 2A-2G) or the client 20 (FIG. 3A) controls and/or implements the request failure rate 170 for a security credential 202. Generally speaking, an administrator 10 or a client 20 may have concerns about the full disablement of a security credential 202 (e.g., to update, replace, or delete the security credential 202). For example, a particular security credential 202 may be used more often and quite valuable. When a credential system 100 has a large number of clients 20, full disablement of a valuable security credential 202 may cause outages or issues with running services. These outages or issues may prove costly for administrators 10 or owners of the remote system 140 containing the resources 142. An advantage of the request failure rate 170 is that valuable security credentials 202 may be gradually disabled to ease concerns the client may have about full disablement of those valuable security credentials 202 and/or to mitigate issues with the disablement in a controlled number of affected services or hardware. In some examples, the credential manager 200 receives the request failure rate 170 (e.g., from the administrator 10 or the client 20) and grants or denies access to a resource 142 based on the received request failure rate 170 for a security credential 202. In other words, the request failure rate 170 is a preprogrammed target denial rate for the credential manager 200 when the request authenticator 162 satisfies the security credential 202. In some implementations, the credential manager 200 receives more than one request failure rate 170, such as a first request failure rate 170a and a second request failure rate 170b. In some examples, the second request failure rate 170b is latter in time and modifies the first request failure rate 170a. In other implementations, the credential manager 200 receives a failure rate change request 170c that is configured to change the request failure rate 170. For example, the failure rate change request 170c includes instructions to change the failure rate 170 after some period of time or at some set time (e.g., five minutes after the credential manager 200 receives the failure rate change request 170c). In other words, receipt of a subsequent failure rate (e.g., the second failure rate 170b) or the failure rate change request 170c may trigger a modification to the preceding (or existing) failure rate (e.g., the first failure rate 170a). With the credential manager 200 able to receive more than one failure rate 170 and/or failure rate change requests 170c, the credential system 100 enables credential disablement customization.

Additionally or alternatively, the credential manager 200 sends, and the client 20 receives, a request response 180 that indicates a grant or a denial of access to the requested resource 142. In some implementations, the administrator 10 is configured to receive the request 160 and request response 180. With the request 160 and the request response 180, an administrator 10 or the credential system 100 may track a real-time failure rate 172. In some examples, the credential manager 200 also tracks the real-time failure rate 172 (e.g., by a counter 210 shown in FIG. 2A). The real-time failure rate 172 may correspond to a number of received requests 160 that have had corresponding request authenticators 162 that satisfy the security credential 202 and have been denied access to the requested resource 142. In some implementations, the credential manager 200 and/or administrator 10 is configured to compare the real-time failure rate 172 to a real-time failure rate threshold 174. By comparing the real-time failure rate 172 to the real-time failure rate threshold 174, the credential system 100 may monitor the request failure rate 170.

FIGS. 2A-2G are examples of the credential manager 200 in further detail. In these examples, the credential manager 200 includes a counter 210 and/or an implementer 220. Although FIGS. 2A-2D illustrate the counter 210 before the implementer 220, the credential manager 200 may implement the counter 210 and the implementer 220 in any order. As an example, the implementer 220 may grant, deny, or perform a remedial action such that the counter 210 tracks the real-time failure rate 172 and/or the real-time failure rate threshold 174 based on the actions of the implementer 220. In other examples, the counter 210 is configured to influence the decision of the implementer 220 by determining the real-time failure rate 172, the real-time failure rate threshold 174, and/or a number of received requests 160 that correspond to request authenticators 162 that satisfy the security credential 202 before the implementer 220 performs an action (e.g., grant, deny, etc.). The counter 210 may be configured to determine at least one of a denial count for request authenticators 162 satisfying the security credential 202, a percentage of request authenticators 162 satisfying the security credential 202 and denied access to the requested resource 142, or a percentage of request authenticators 162 satisfying the security credential 202 and granted access to the requested resource 142.

Figure 2A:
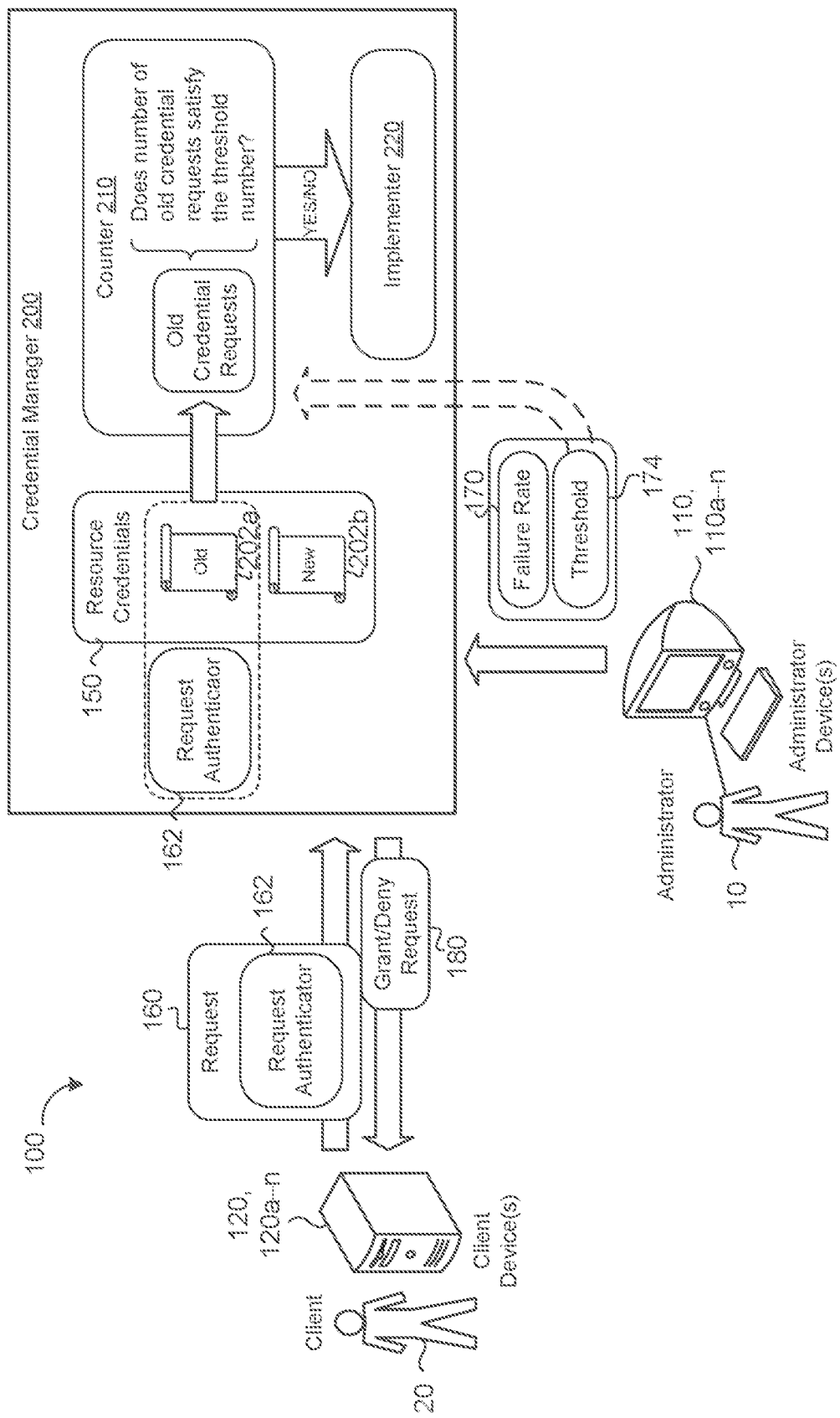
FIG. 2A-2G are schematic views of example credential managers of a credential system for managing access to resources.

Referring further to FIGS. 2A-2F, FIGS. 2A-2F depict the resource credential system 150 within the credential manager 200. These examples also illustrate the administrator 10 communicating the request failure rate 170 and/or the real-time failure rate threshold 174 to the credential manager 200. The client 20 sends a request 160 with a request authenticator 162 via the network 130 to the remote system 140 that is received by the credential manager 200. Although FIGS. 2A-2F depict the credential manager 200 comparing the request authenticator 162 to two security credentials 202*a-b* associated with the requested resource 142, as described above, the credential manager 200 is configured to compare any number of security credentials 202*a-n* (e.g., including a single security credential 202) to the request authenticator 162. Referring to FIGS. 2A-2F, the credential manager 200 and/or the resource credential system 150 identifies an old security credential 202*a* and a new security credential 202*b* associated with the resource 142 of the request 160. The identification of the old security credential 202*a* and the new security credential 202*b* may be representative of a situation where the new security credential 202*b* updates or replaces the old security credential 202*a*, and the client 20 and/or the administrator 10 permits the old security credential 202*a* to be gradually disabled according, to the request failure rate 170. FIG. 2A is an example illustrating that when the request authenticator 162 satisfies the old security credential 202*a*, the counter 210 may determine whether to advise the implementer 220 to perform an action (e.g., grant, deny, or perform a remedial action) based on the request failure rate 170 and/or the real-time failure rate threshold 174.

Figure 2B:
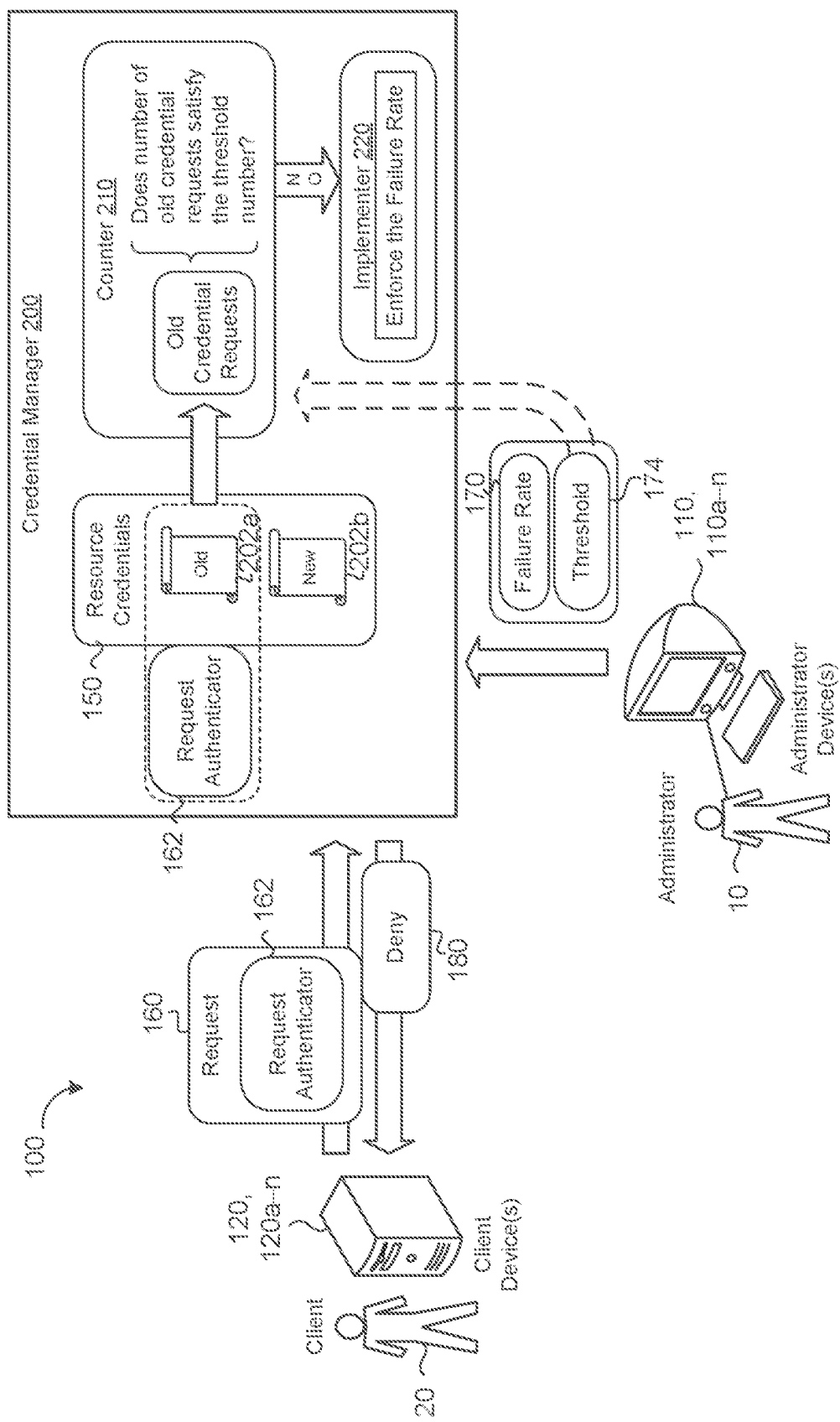

FIG. 2B is an example where the request authenticator 162 satisfies the security credential 202 (shown as satisfying die old security credential 202*a*). Here, the counter 210 indicates to the implementer 220 that the number of requests 160 where the request authenticator 162 satisfies the security credential 202 (e.g., the old security credential 202*a*) does not exceed a threshold. As an example, the counter 210 identifies that the real-time failure rate 172 is less than the real-time failure rate threshold 174 and the counter 210 communicates this identification to the implementer 220 (e.g., "No"). Based on the counter 210, the implementer 220 enforces the request failure rate 170 and denies the request 160 for access to the resource 142 by the client 20.

Figure 2C:
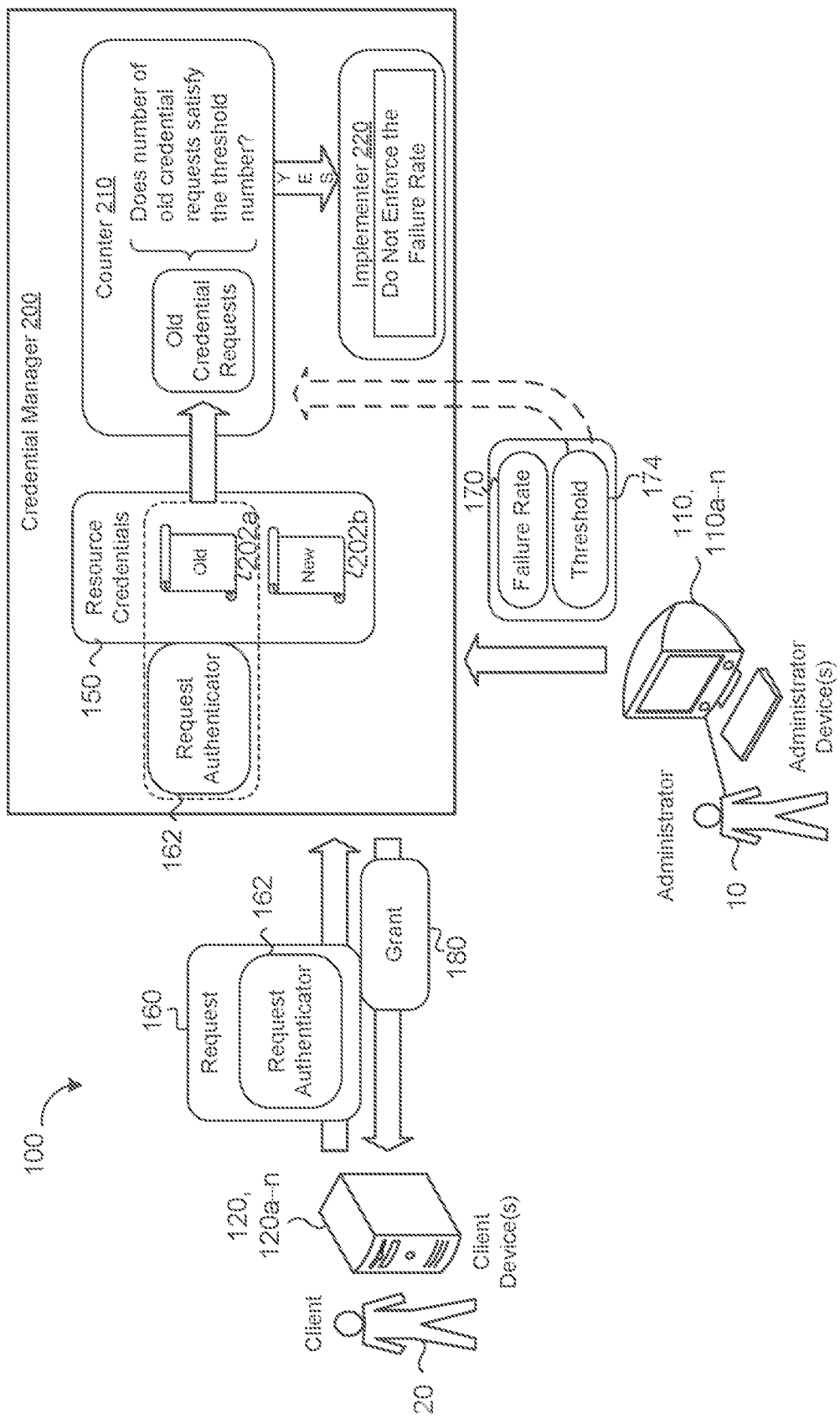

Similar to FIG. 2B, FIG. 2C is an example where the request authenticator 162 satisfies the security credential 202 (shown as satisfying the old security credential 202*a*). In this example, however, the counter 210 determines that the number of requests 160 where the request authenticator 162 satisfies the security credential 202 (e.g., the old security credential 202*a*) does exceed a threshold. For example, the counter 210 determines that the real-time failure rate 172 is equal or greater than the real-time failure rate threshold 174 and the counter 210 communicates this determination to the implementer 220 (e.g., "YES"). Based on the counter 210, the implementer 220 does not enforce the request failure rate 170 and grants the request 160 for access to the resource 142 by the client 20.

Figure 2D:
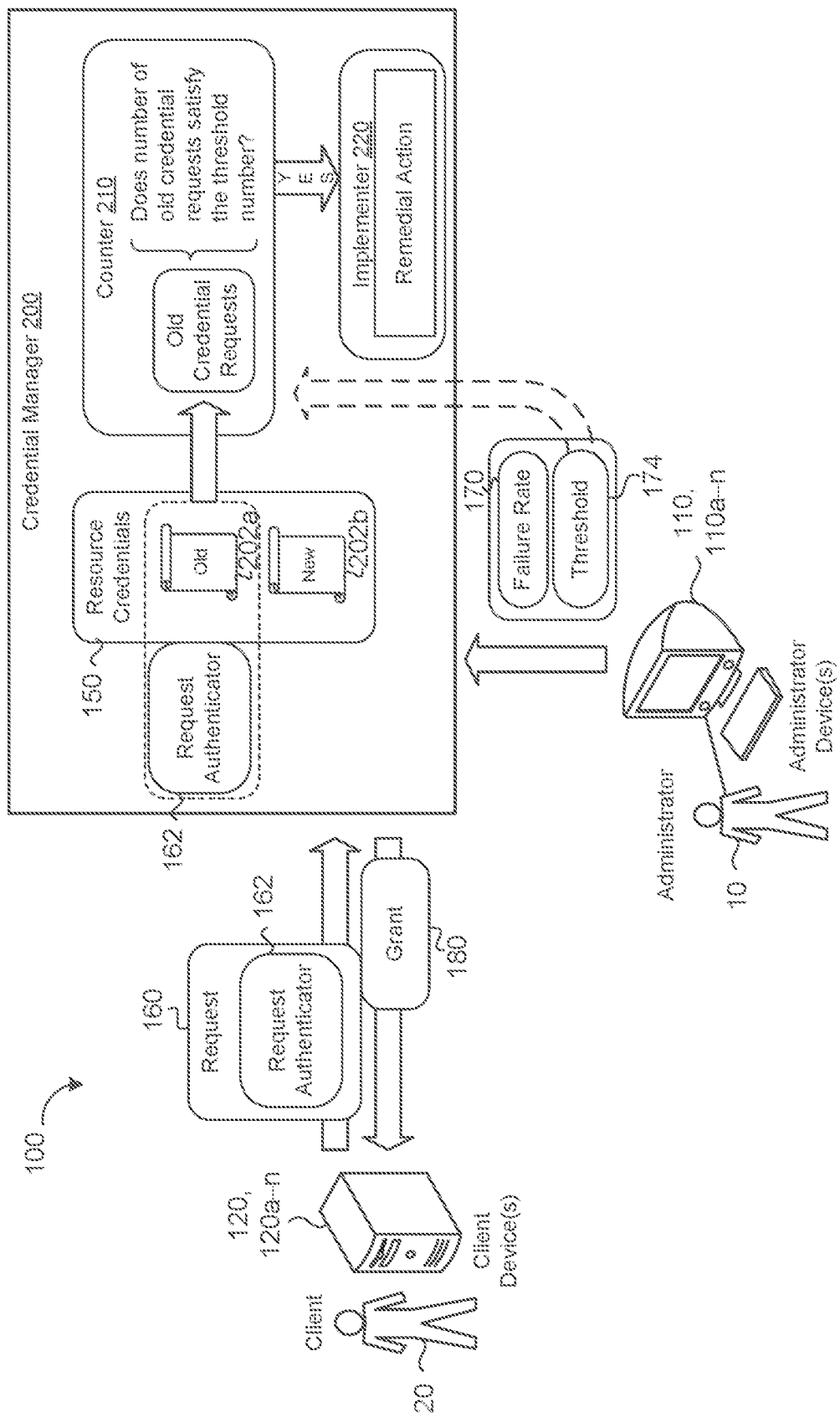

FIG. 2D is yet another example where the request authenticator 162 satisfies the security credential 202 (shown as satisfying the old security credential 202*a*). In this example, the counter 210 determines that the number of requests 160 where the request authenticator 162 satisfies the security credential 202 (e.g., the old security credential 202*a*) does exceed a threshold. For example the counter 210 determines that the real-time failure rate 172 is equal or greater than the real-time failure rate threshold 174 and the counter 210 communicates this determination to the implementer 220 (e.g., "YES"). Based on the counter 210, the implementer 220 decides to implement a remedial action. In some examples, such as the example of FIG. 2D, the remedial action of the implementer 220 is to grant the request 160 for access to the resource 142 by the client 20. This approach of granting the request 160 may aid to stabilize the real-time failure rate 172 in relation to the request failure rate 170 as the entity (e.g., the administrator 10 or the client 20) desired. In other examples, the remedial action of the implementer 220 is to roll back the gradual credential disablement by, for example, reducing the request failure rate 170. For example, if suddenly a request failure rate 170 of 60% led to a real-time failure rate 172 of 90%, the implementer 220 is configured to reduce the request failure rate 170 to 30%.

Figure 2E:
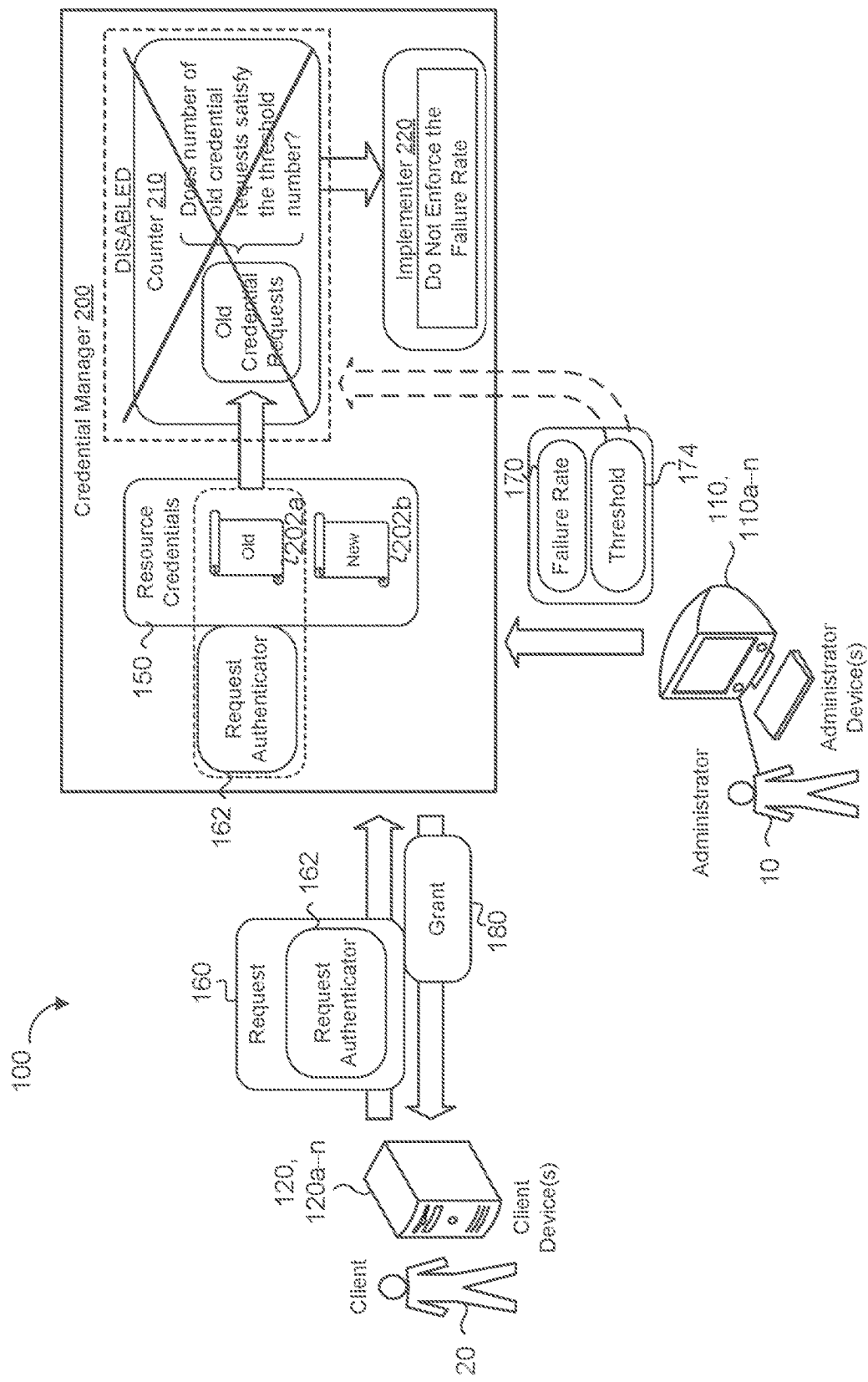

Referring to FIG. 2E, the credential manager 200 may be configured to determine whether the request failure rate 170 is enabled or disabled FIG. 2E is also an example where the request authenticator 162 satisfies the security credential 202 (shown as satisfying the old security credential 202*a*), but, as depicted, the request failure rate 170 is disabled. In examples like FIG. 2E, where the credential manager 200 determines that the request failure rate 170 is disabled, the implementer 220 may grant the request 160 for access to a resource 142. Here, the decision to grant the request 160 by the implementer 220 is not based on the counter 210, as the counter 210 can be bypassed (shown as an X) when the request failure rate 170 is disabled. In some implementations, the credential manager 200 does not receive a request failure rate 170 corresponding to the security credential 202 associated with the requested resource 142. In other implementations, the administrator 10 and/or the credential manager 200 decides to disable the request failure rate 170 (e.g., for remedial action).

Figure 2F:
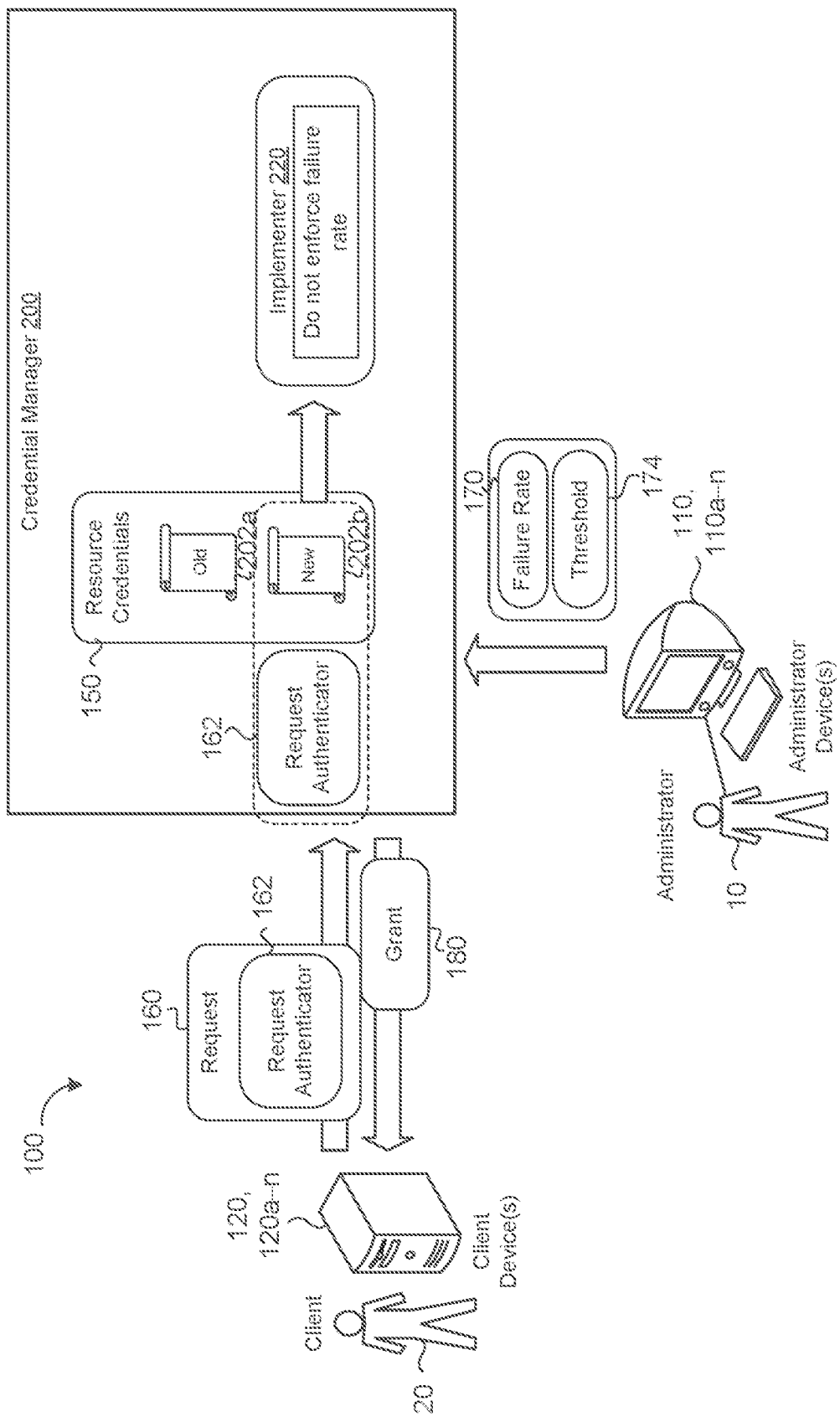

FIG. 2F is an example where the credential manager 200 determines that the request authenticator 162 satisfies the new security credential 202*b*. When the request authenticator 162 satisfies the new security credential 202*b*, the implementer 220 grants access to the requested resource 142. As depicted in FIG. 2F, the implementer 220 decides not to enforce the request failure rate 170, because, here, the request failure rate 170 is associated with the old security credential 202*a* and not the new security credential 202*b*. In other words, the request failure rate 170 fails to apply to the new security credential 202*b*. For example, the administrator 10 or client 20 have not associated a request failure rate 170 with the new security credential 202*b*.

Figure 2G:
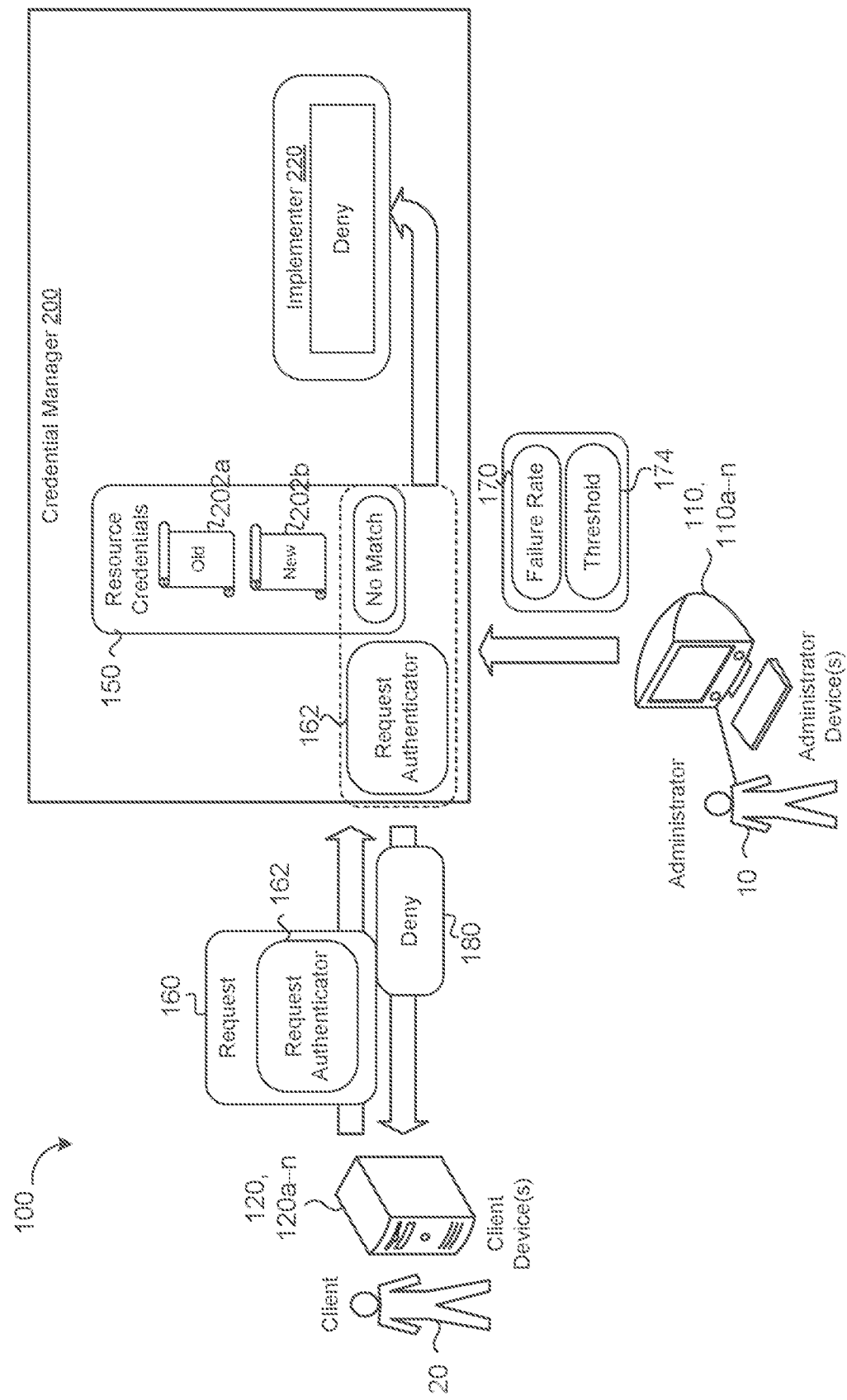

FIG. 2G is an example where the request authenticator 162 fails to match a security credential 202 of the credential manager 200 and/or the resource credential system 150. In these examples, the credential manager 200 fails to authenticate the identity supplied with the request 160. Based on this failure, the credential manager 200 prevents unauthorized identities from accessing the resources 142 of the remote system 140.

Figure 3A:
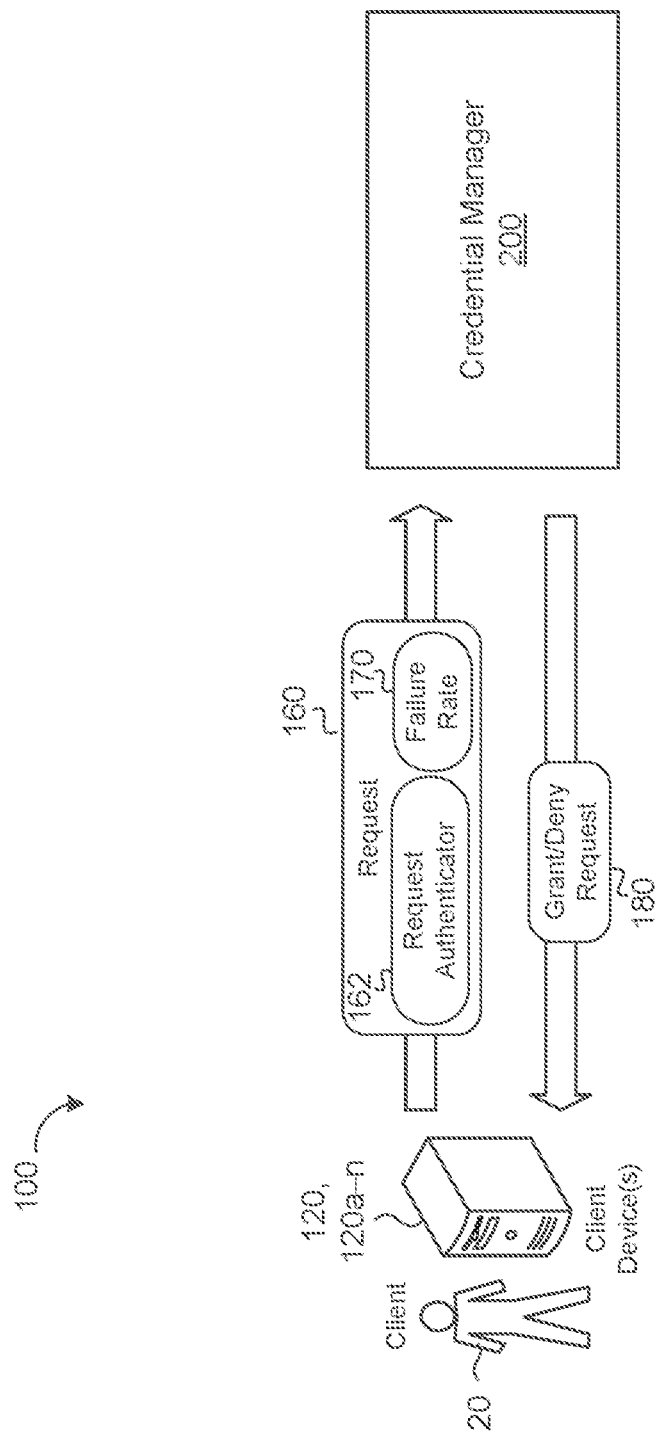
FIG. 3A is a schematic view of an example credential system from the client perspective.
Figure 3B:
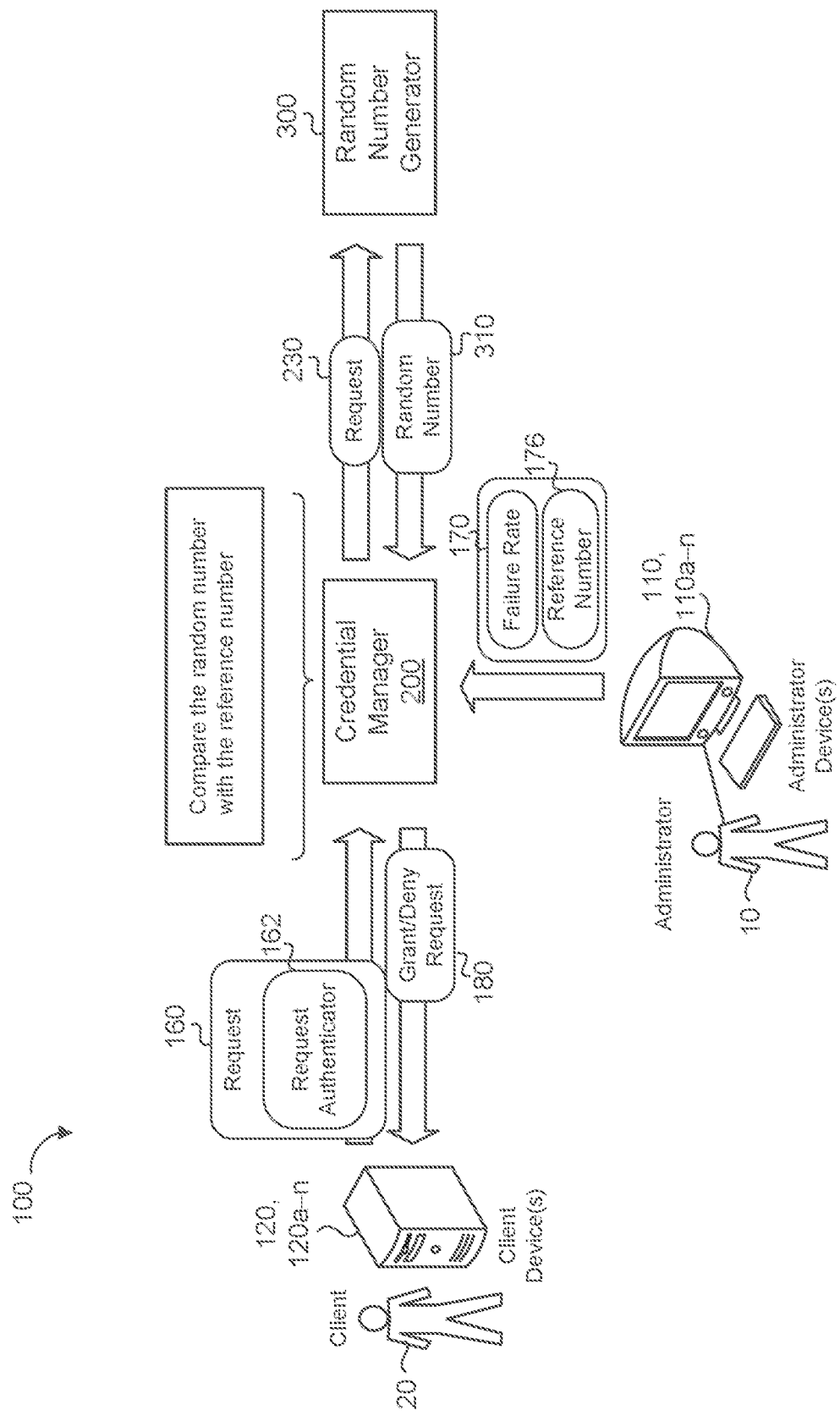
FIG. 3B is a schematic view of an example credential system using a random number generator for credential management.

FIG. 3A is an example where the client 20 configures the request failure rate 170 associated with a security credential 202. In some implementations, the client 20 communicates the request 160 to the credential manager 200. Similar to FIGS. 1-2G, the credential manager 200 compares the request authenticator 162 against a security credential 202 associated with the requested resource 142. Based on whether the credential manager 200 determines that the request authenticator 162 satisfies the security credential 202, the credential manager 200 grants or denies access to the requested resource 142.

FIG. 3B is an example of how the credential system 100 may grant or deny access to the requested resource 142. In some implementations, a requested failure rate 170 includes a reference number 176. When the request authenticator 162 satisfies the security credential 202 associated with the requested resource 142, the credential manager 200 communicates with a random number generator 300. As shown in FIG. 3B, the credential manager 200, in some examples, communicates a random number request 230. The random number generator 300 is configured to generate a random number 310 based on communication with the credential manager 200 (e.g., receiving a random number request 230). In some examples, the random number 310 is constrained between an upper and a lower boundary that corresponds to the requested failure rate 170. For example, if the requested failure rate 170 is 10%, the random number generator 300 may be confined to generation of a random number 310 between 1 and 10. The credential manager 200 obtains the random number 310 and compares the random number 310 to the reference number 176. In the example where the requested failure rate 170 is 10% and the random number 310 is between 1 and 10, the reference number may also be between 1 and 10 (e.g., 2). Based on the comparison between the random number 310 and the reference number 176, the credential manager 200 grants or denies access to the requested resource 142. In the basic example where the requested failure rate 170 is 10%, the random number 310 is between 1 and 10, and the reference number is 2, the random number generator 300 generates a random number 310 of 4. In this example, the credential manager 200 attempts to apply the request failure rate of 10%, therefore the credential manager 200 determines that requested access to the resource 142 will be denied whenever the random number 310 equals the reference number 176. Here, the random number 310 of 4 fails to equal the reference number 176 of 1 and the credential manager 200 grants access to the requested resource 142. In some other simple illustrations the reference number 176 may be an even or an odd designation for a 50% request failure rate 170 or the reference number 176 may be a range of values to correlate with the requested failure rate 170.

Figure 4:
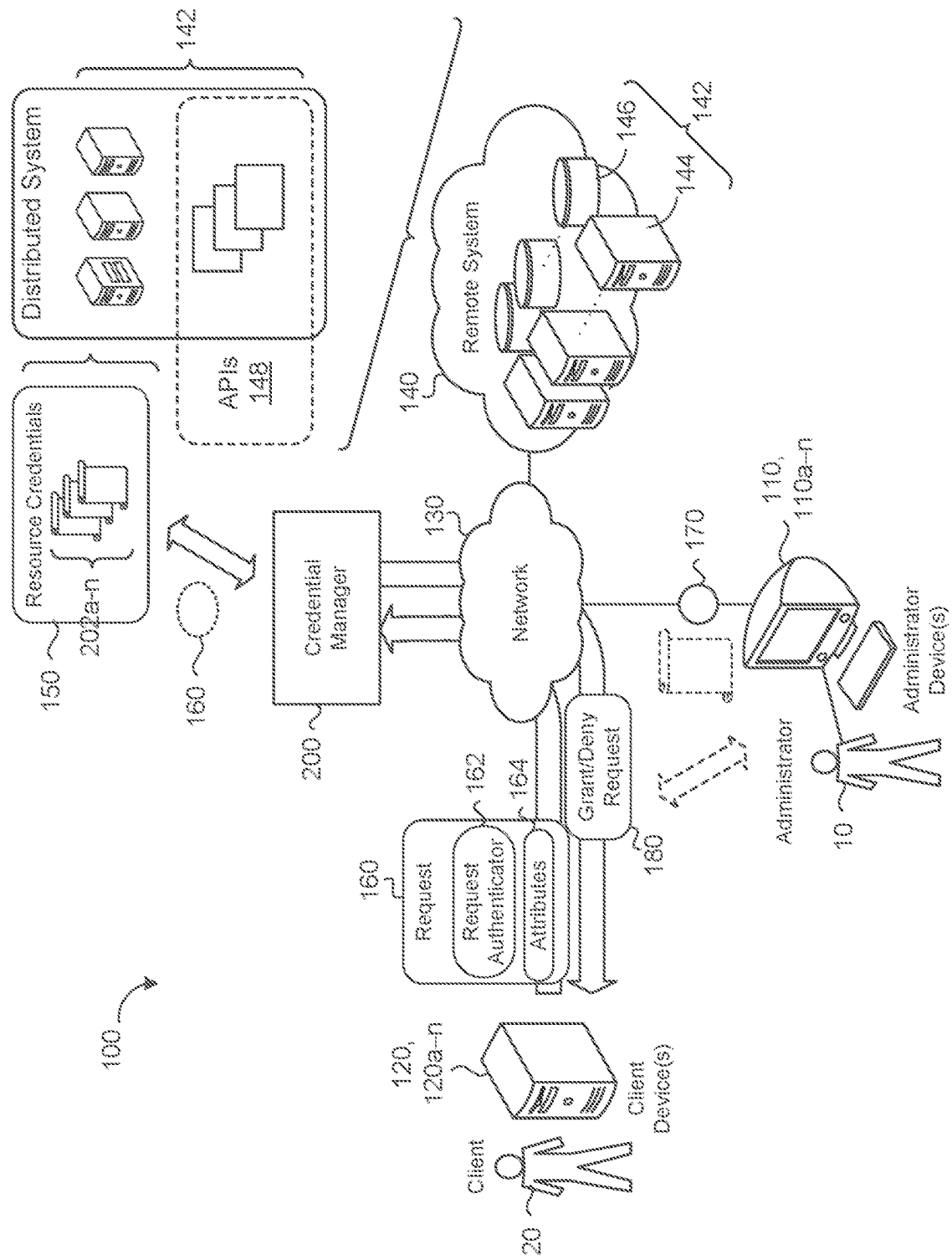
FIG. 4 is a schematic view of an example credential system for managing access to resources.

Much like the reference number 176, the request failure rate 170 may have many different configurations or coupled to other variables. In some examples, the request 160, the request authenticator 162, or the associated security credential 202 identifies attributes 164 of the client 20. In some implementations, the client 20 provides attributes 164 with the request 160 separate from the request authenticator 162 or the associated security credential 202. These client attributes may be acquired in any manner and associated with the request failure rate 170. For example, FIG. 4 illustrates the client 20 providing attributes 164 with the request 160. FIG. 4 is identical to FIG. 1 except for these attributes 164. Some examples of client attributes 164 are geographic locations (e.g., region), type of client (e.g., software developer, software consumer, cloud storage customer, etc.), or client stickiness (e.g., retention times spent for various resources 142). Based on these attributes 164, an administrator 10 or a client 20 may configure the request failure rate 170. An administrator 10 may decide to associate a low request failure rate with clients 20 with high stickiness for a given resource 142. In other examples, an administrator 10 coordinates the request failure rate 170 such that clients 20 in high use areas (e.g., Silicon Valley or the Pacific Northwest) have low request failure rates 170 initially for various APIs 148 used for software development. In some examples, an administrator 10 or client 20 has a security policy associated with a resource 142 such that when the credential system 100 identifies the client 20 as a particular customer with the security policy, the security policy may dictate the request failure rate 170 for a security credential 202 associated with the resource 142.

In some examples, the request failure rate 170 is a function of time. The request failure rate 170 may change linearly as a function of time. For example, the request failure rate 170 follows an automated ramp with a given slope (e.g., 10% per hour). In some implementations, the request failure rate 170 disables the security credential 202 exponentially. Additionally or alternatively, credential disablement has a finite window. For example, the security credential 202 is disabled by a certain date and/or time (e.g., 24 hours to disable the security credential 202). In other words, the request failure rate 170 is customizable to the client 20, the administrator 10, and/or the schedules of each.

Figure 5:
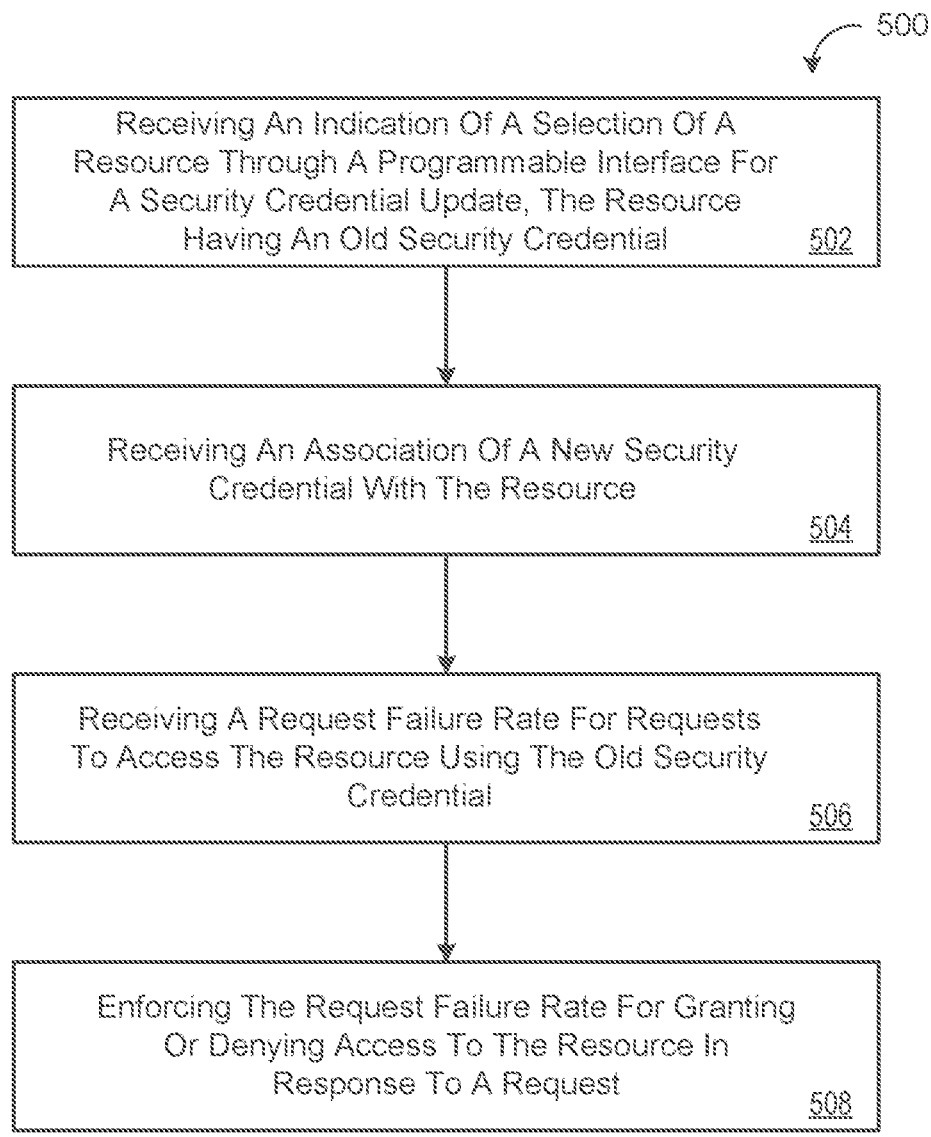
FIG. 5 is a flow chart of an example method for managing access to resources.

FIG. 5 is a flowchart of an example method 500 within a remote system 140 such as a distributed system. At block 502 the method 500 receive an indication of a selection of a resource 142 through a programmable interface for a security credential update. The resource 142 has an associated old security credential 202a. At block 504, the method 500 receives an association of a new security credential 202b with the resource 142. At block 506, the method 500 receives a request failure rate 170 for requests 170 to access the resource 142 using the old security credential 202a. At block 508, the method 500 is configured to enforce the request failure rate 170 for granting or denying access to the resource 142 in response to receiving a given request 160 having a corresponding request authenticator 162 satisfying the old security credential 202a. Optionally, the method 500 within the remote system 140 may receive the given request 160 for access to the resource 142 where the given request 160 includes the request authenticator 162. The method 500 may also compare the request authenticator 162 against the old security credential 202a associated with the resource 142 and the new security credential 202b associated with the resource 142. When the request authenticator 162 satisfies the old security credential 202a, the method 500 may granting or denying access to the resource 142 based on the request failure rate 170 associated with the old security credential 202a. When the request authenticator 162 satisfies the new security credential 202b, the method 500 may grant access to the resource 142. Additionally or alternatively, when the request authenticator 162 fails to satisfy the old security credential 202a and the new security credential 202b, the method 500 may deny access to the resource 142.

Figure 6:
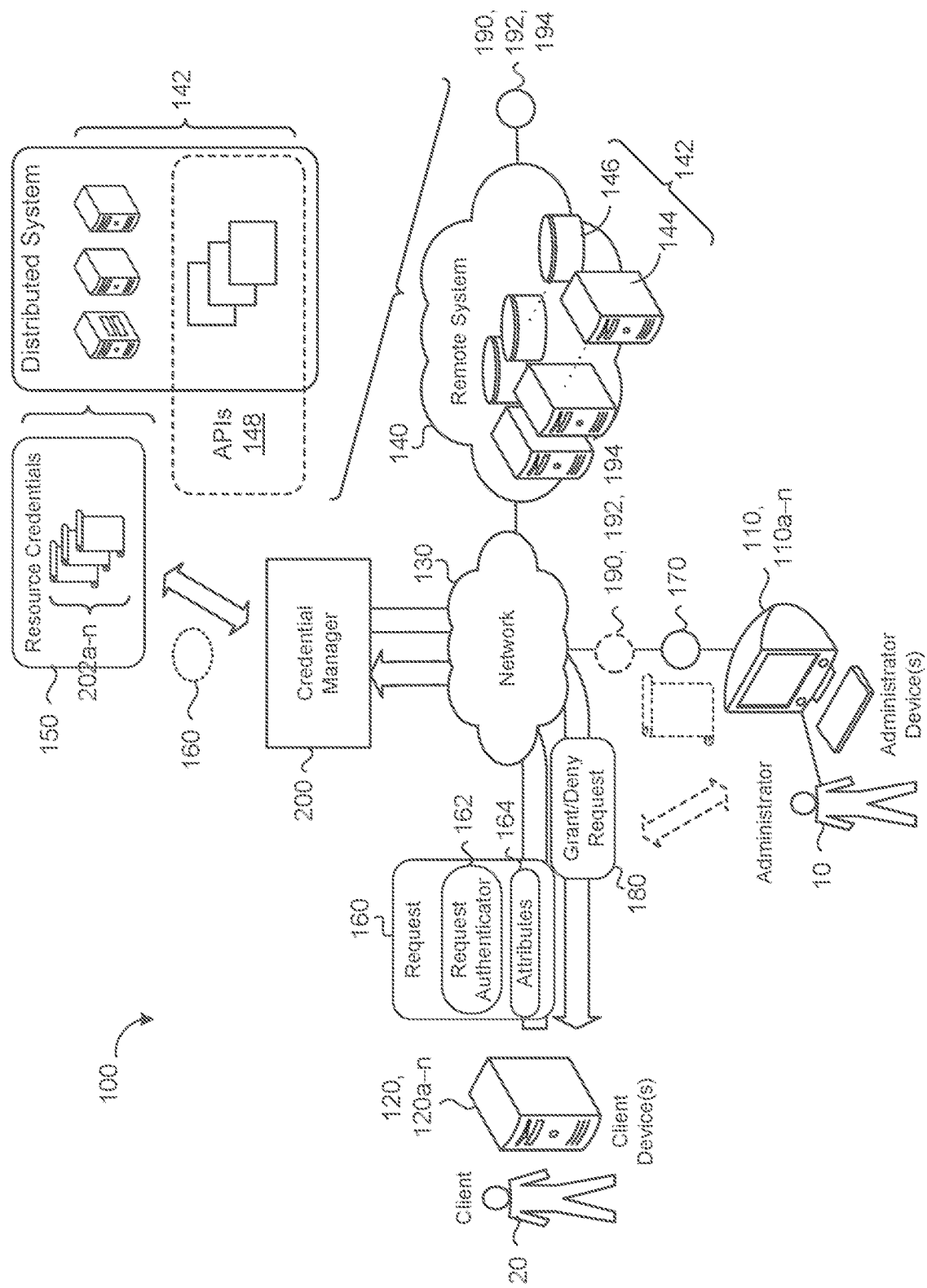
FIG. 6 is a schematic view of an example credential system for managing access to resources with system health metrics.

In some examples such as FIG. 6, the remote system 140 (e.g., a distributed system) includes high availability data and low availability data corresponding to the resources 142 of the remote system 140. FIG. 6 is similar to FIGS. 1 and 4 except for the health system metrics 190. The remote system 140 may receive requests 160 for services that use the high availability data and/or the low availability data and/or requests 160 specifically for the high availability data and/or the low availability data. Some remote systems 140 may be configured with system health metrics 190 that indicate identifiers of the "health" of the remote system 140. Generally speaking, the health of the remote system 140 is the ability to respond to requests 160 and/or to allow resources 142 to be readily available to when access is warranted (e.g., permitted). Some examples of system health metrics 100 include resource data statistics. In one example, the remote system 140 monitors how many requests 160 occur for each resource 142. In these instances, a sudden flux (e.g., increase) in a number of requests 160 may indicate that clients 20 have to repeat requests 160 for resources 142 due to system issues (e.g., issues with security credentials 202, time-out errors, etc.). Alternatively, a sudden flux (e.g., decrease) may indicate that clients 20 have abandoned using a particular resource 142 (e.g., the resource 142 does not appear accessible, has been corrupted, or removed). Although the number of requests 160 is one example of system health metrics 190, other resource data statistics may be designed as a system health metric 190.

In some implementations, the remote system 140 receives health metric information 192 corresponding to at least one system health metric 190 along with a remediation action 194. For example, administrators 10, owners, or entities related to the remote system 140 receive the health metric information 192. Additionally or alternatively, clients 20 may receive the health metric information 192. The remediation action 194 is configured to remediate the at least one system health metric 190. For example, the remediation action 194 is to repair an underlying resources 142 or to repair issues with a security credential 202. In some examples, the remote system 140 (e.g., via administrators 10) determines that the at least one system health metric 190 indicates remediation. For example, the health metric information 192 indicates an anomaly and/or discrepancy related to a resource data statistics. When the remote system 140 determines that the at least one system health metric 190 indicates remediation, the remote system 140 implements the received remediation action 194.

Figure 7:
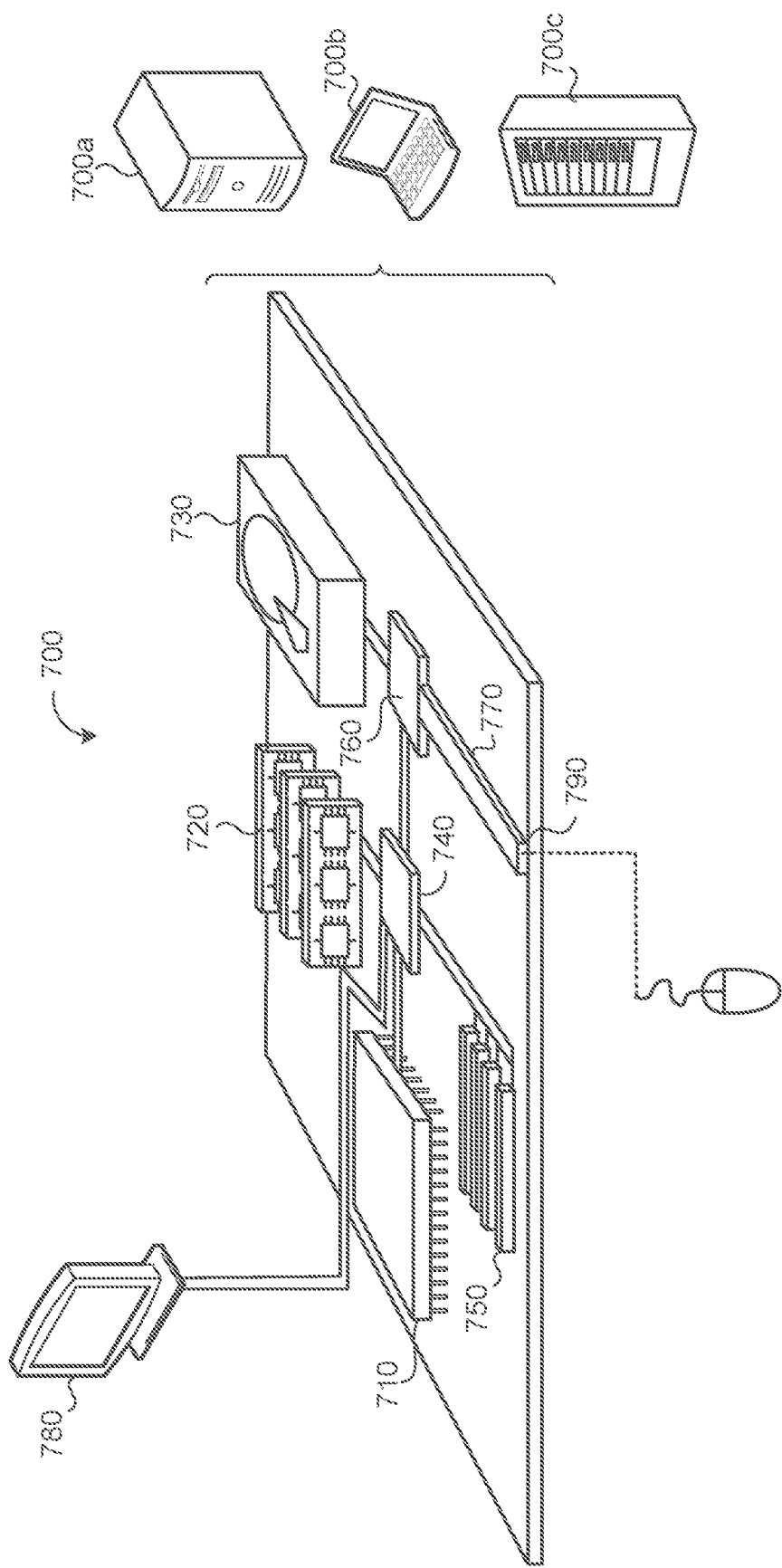
FIG. 7 is a schematic view of an example computing device that may be used to implement the systems and methods within the credential system.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, virtual machines, containers, and other appropriate computers and/or execution environments configured to obtain and to execute instructions from memory. The components shown here, their connections and relationships, and their functions, are meant to be exemplary only, and are not meant to limit implementations of the inventions described and/or claimed in this document.

The computing device 700 includes a processor 710 (also referred to as data processing hardware), memory 720 (also referred to as memory hardware), a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interlace (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor or data processing hardware, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks, magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. This interaction may also include providing an API, receiving requests from client software, and/or producing responses formatted to be usable by the client software.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    receiving, from a client, a request to access a resource, the request comprising a request credential;
    obtaining a security credential associated with the resource;
    comparing the request credential to the security credential;
    determining that the client is authorized to access the resource based on the comparison of the request credential and the security credential; and
    based on determining that the client is authorized to access the resource:
    determining a request failure rate associated with the security credential;
    determining that denying the request satisfies the request failure rate, wherein determining that denying the request satisfies the request failure rate comprises determining that the request failure rate is enabled; and
    based on determining that denying the request satisfies the request failure rate, denying access to the resource.

2. The method of claim 1, wherein determining that denying the request satisfies the request failure rate comprises:
    obtaining a random number; and
    comparing the random number with a reference number associated with the request failure rate.

3. The method of claim 1, wherein the operations further comprise:
    determining that a number of received requests having corresponding request credentials satisfying the security credential satisfies a threshold number; and
    implementing a remedial action.

4. The method of claim 3, wherein implementing the remedial action comprises:
    granting access to the resource when the request credential satisfies the security credential; and
    not enforcing the request failure rate associated with the security credential.

5. The method of claim 1, wherein:
    the security credential comprises an old security credential and a new security credential; and
    determining whether granting or denying the request satisfies the request failure rate comprises determining whether the request credential satisfies the new security credential.

6. The method of claim 1, wherein the operations further comprise:
    receiving an indication of a selection of the resource through a user interface for a security credential update;
    receiving an association of a new security credential with the resource; and
    receiving the request failure rate for requests to access the resource using the security credential.

7. The method of claim 1, wherein the security credential comprises at least one of a public key or a hash message authentication code (hmac) key.

8. The method of claim 1, wherein the request failure rate increases based on a function of time.

9. The method of claim 1, wherein the request failure rate comprises at least one of:
    a denial count for request credentials satisfying the security credential;
    a percentage of request credentials satisfying the security credential and denied access to the resource; or
    a percentage of request credentials satisfying the security credential and granted access to the resource.

10. A system comprising:
    data processing hardware; and
    memory hardware in communication with the data processing hardware, the memory hardware storing instructions that when executed on the data processing hardware cause the data processing hardware to perform operations comprising:

receiving, from a client, a request to access a resource, the request comprising a request credential;
obtaining a security credential associated with the resource;
comparing the request credential to the security credential;
determining that the client is authorized to access the resource based on the comparison of the request credential and the security credential; and
based on determining that the client is authorized to access the resource:
determining a request failure rate associated with the security credential;
determining that denying the request satisfies the request failure rate, wherein determining that denying the request satisfies the request failure rate comprises determining that the request failure rate is enabled; and
based on determining that denying the request satisfies the request failure rate, denying access to the resource.

11. The system of claim 10, wherein determining that denying the request satisfies the request failure rate comprises:
obtaining a random number; and
comparing the random number with a reference number associated with the request failure rate.

12. The system of claim 10, wherein the operations further comprise:
determining that a number of received requests having corresponding request credentials satisfying the security credential satisfies a threshold number; and
implementing a remedial action.

13. The system of claim 12, wherein implementing the remedial action comprises:

granting access to the resource when the request credential satisfies the security credential; and
not enforcing the request failure rate associated with the security credential.

14. The system of claim 10, wherein:
the security credential comprises an old security credential and a new security credential; and
determining whether granting or denying the request satisfies the request failure rate comprises determining whether the request credential satisfies the new security credential.

15. The system of claim 10, wherein the operations further comprise:
receiving an indication of a selection of the resource through a user interface for a security credential update;
receiving an association of a new security credential with the resource; and
receiving the request failure rate for requests to access the resource using the security credential.

16. The system of claim 10, wherein the security credential comprises at least one of a public key or a hash message authentication code (hmac) key.

17. The system of claim 10, wherein the request failure rate increases based on a function of time.

18. The system of claim 10, wherein the request failure rate comprises at least one of:
a denial count for request credentials satisfying the security credential;
a percentage of request credentials satisfying the security credential and denied access to the resource; or
a percentage of request credentials satisfying the security credential and granted access to the resource.

* * * * *